United States Patent
Stephenson (10) Patent No.: US 10,577,910 B2
(45) Date of Patent: Mar. 3, 2020

(54) FUEL CELLS FOR POWERING WELL STIMULATION EQUIPMENT

(71) Applicant: Halliburton Energy Services, Inc., Houston, TX (US)

(72) Inventor: Stanley Vernon Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/313,380

(22) PCT Filed: Aug. 12, 2016

(86) PCT No.: PCT/US2016/046735
§ 371 (c)(1),
(2) Date: Dec. 26, 2018

(87) PCT Pub. No.: WO2018/031029
PCT Pub. Date: Feb. 15, 2018

(65) Prior Publication Data
US 2019/0162061 A1    May 30, 2019

(51) Int. Cl.
*E21B 43/26* (2006.01)
*F04B 17/03* (2006.01)
(Continued)

(52) U.S. Cl.
CPC .............. *E21B 43/26* (2013.01); *F04B 17/03* (2013.01); *H01M 8/0662* (2013.01); *H01M 8/22* (2013.01); *H01M 8/24* (2013.01); *H01M 2250/10* (2013.01)

(58) Field of Classification Search
None
See application file for complete search history.

(56) References Cited

U.S. PATENT DOCUMENTS 7,096,955 B2    8/2006    Zhang et al.
8,327,942 B2    12/2012   Grimseth et al.
(Continued)

FOREIGN PATENT DOCUMENTS

WO    98/40603 A2    9/1998

OTHER PUBLICATIONS

LaMonica, Martin. "GE claims fuel cell breakthrough starts pilot production." IEEE Spectrum (2014), found at https://spectrum.ieee.org/energywise/green-tech/fuel-cells/ge-claims-fuel-cell-breakthrough-starts-pilot-production, 3 pages.
(Continued)

*Primary Examiner* — Matthew R Buck
*Assistant Examiner* — Douglas S Wood
(74) *Attorney, Agent, or Firm* — John W. Wustenberg; Baker Botts L.L.P.

(57) ABSTRACT

In accordance with presently disclosed embodiments, a system and method for using fuel cells to generate electricity for powering well stimulation equipment (e.g., high pressure hydraulic pumping units) at a well stimulation site are provided. The fuel cells may be coupled to the stimulation equipment via a DC/AC converter and, in some embodiments, via a variable frequency drive (VFD). The fuel cells may be arranged in a fuel cell stack that is used to generate electricity to power various electrical devices (e.g., electric motors) on the equipment. The fuel cells generally operate at higher efficiencies than is available through the use of diesel engines. In addition, the fuel cells may require less frequent refueling and provide a more centrally located area for refueling, lower emissions, and quieter operations than are currently available using diesel engines.

20 Claims, 3 Drawing Sheets

(51) Int. Cl.
    *H01M 8/22*     (2006.01)
    *H01M 8/24*     (2016.01)
    *H01M 8/0662*   (2016.01)

(56) References Cited

U.S. PATENT DOCUMENTS

| | | | | |
|---|---|---|---|---|
| 8,657,011 | B2* | 2/2014 | Vyas | E21B 33/0355 |
| | | | | 166/335 |
| 8,794,307 | B2 | 8/2014 | Coqilleau et al. | |
| 2011/0290483 | A1* | 12/2011 | Zornes | E21B 41/0085 |
| | | | | 166/271 |
| 2013/0118735 | A1* | 5/2013 | Jamal | H01M 8/0675 |
| | | | | 166/266 |
| 2015/0068808 | A1* | 3/2015 | Gard | E21B 7/046 |
| | | | | 175/57 |
| 2016/0190622 | A1* | 6/2016 | Whyatt | H01M 8/0662 |
| | | | | 429/423 |

OTHER PUBLICATIONS

Cheng, Zhe, et al. "A Solid Oxide Fuel Cell Running on H2S/CH4 Fuel Mixtures." Electrochemical and solid-state letters 9.1 (2006): A31-A33.

International Search Report and Written Opinion issued in related PCT Application No. PCT/US2016/046735 dated May 8, 2017, 15 pages.

* cited by examiner

FUEL CELLS FOR POWERING WELL STIMULATION EQUIPMENT

CROSS-REFERENCE TO RELATED APPLICATION

The present application is a U.S. National Stage Application of International Application No. PCT/US2016/046735 filed Aug. 12, 2016, which is incorporated herein by reference in its entirety for all purposes.

TECHNICAL FIELD

The present disclosure relates generally to well stimulation operations, and more particularly, to a system and method for using fuel cells to power equipment used to perform a well stimulation operation at a job site.

BACKGROUND

During the drilling and completion or oil and gas wells, various wellbore treatments are performed on the wells for a number of purposes. For example, hydrocarbon-producing wells are often stimulated by hydraulic fracturing operations, where a servicing fluid such as a fracturing fluid may be introduced into a portion of a subterranean formation penetrated by a wellbore at a hydraulic pressure sufficient to create or enhance fractures therein. Such a fracturing treatment may increase hydrocarbon production from the well.

At a well stimulation site, there are typically several large pieces of fracturing (or other well stimulation) equipment on location that must be powered including, but not limited to, a gel mixer, liquid handling equipment, sand handling equipment, a blender, a plurality of high pressure hydraulic pumping units, and a control center. The equipment on location is used to deliver large quantities of fluid/proppant mixtures to a wellhead at high pressures to perform the desired operations. Often, the hydraulic pumping units and other machinery on location are powered by diesel engines. In general, these diesel engines operate at relatively low efficiencies (e.g., approximately 32%). The stimulation site will often include several individual diesel powered units (e.g., pumping units, blenders, etc.) that must be refueled multiple times a day throughout a multi-stage stimulation operation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for using fuel cells to generate electricity for powering stimulation or fracturing equipment (e.g., high pressure hydraulic pumping units) at a well stimulation site. The term "fracturing equipment" used herein should not be considered as limited to use in fracturing operations, but may be used in a wide variety of other types of well stimulation operations including, but not limited to, well acidizing treatments and techniques using expanded gases to treat a wellbore. The fuel cells may be coupled to the stimulation equipment via a DC/AC converter and, in some embodiments, via a variable frequency drive (VFD). The fuel cells may be arranged in a fuel cell stack that is used to generate electricity to power various electrical devices (e.g., electric motors) on the stimulation equipment. For example, the fuel cells may be coupled to electric motors on high pressure hydraulic pumping units and used to drive hydraulic pumps on the pumping units, thereby pumping treatment fluid to a wellhead at a desired pressure. The hydraulic pumping units may include one or more reciprocating pumps, centrifugal pumps, vane pumps, or other types of pumps. Fuel cells may be used to power other equipment on location as well, including a blender unit, a gel/ADP mixer unit, sand handling equipment, liquid handling equipment, a control center (e.g., tech center), and others.

The well stimulation system components on location may be driven partially or entirely by electrical power generated using the fuel cells, as opposed to diesel engines that are conventionally used on location. The fuel cells generally operate at higher efficiencies than is available through the use of diesel engines. The fuel cells may be stationary or mobile. In addition, the fuel cells may require less frequent refueling and provide a more centrally located area for refueling, lower emissions, and quieter operations than are currently available using diesel engines.

In some embodiments, the fuel cells used on location may include natural gas fuel cells that operate using natural gas as the fuel, hydrogen sulfide (H2S) fuel cells that utilize H2S as the fuel, a combination of both, or any other desirable type of fuel cells. In some embodiments, at least a portion of the fuel may be supplied to the fuel cells from natural gas or sour gas extracted from other wells or pipelines in the field.

Figure 1:
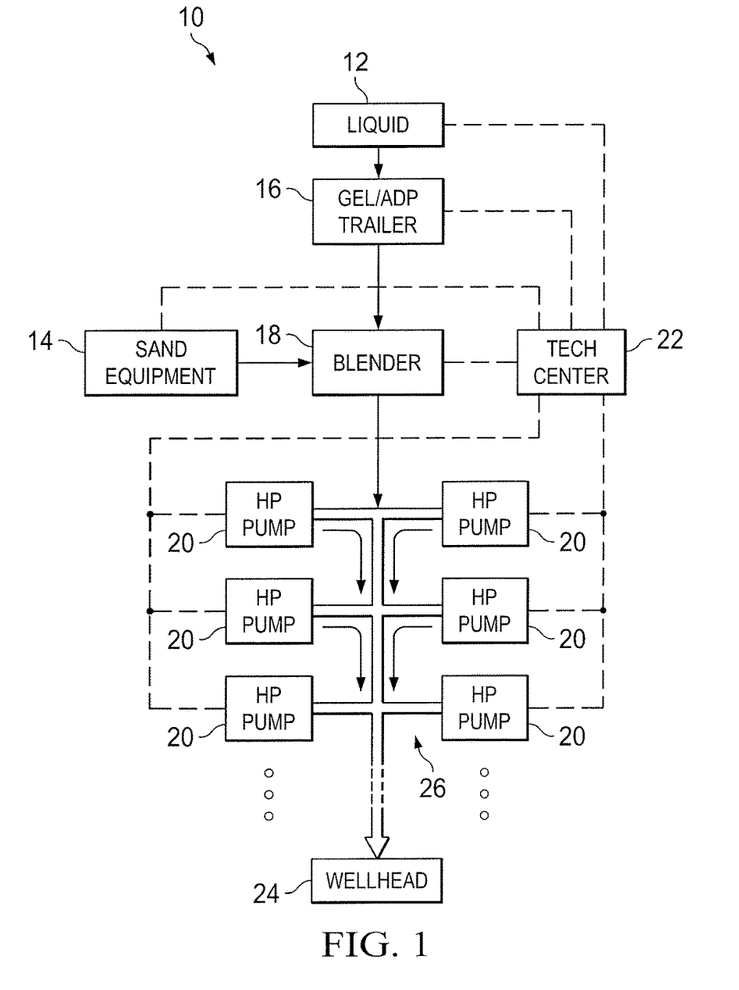
FIG. 1 is a schematic block diagram of a fracturing spread where fuel-cell powered fracturing equipment may be employed, in accordance with an embodiment of the present disclosure.

Turning now to the drawings, FIG. 1 is a block diagram of a well stimulation equipment spread 10 used in treatment (e.g., hydraulic fracturing treatment) of a well. The fracturing spread 10 may include liquid handling equipment 12, sand handling equipment 14, gel/advanced dry polymer (ADP) handling equipment 16 (e.g., gel/ADP trailer), a blender unit 18, a plurality of high pressure hydraulic pumping units 20, a control center 22 (e.g., tech center), and a wellhead 24. In some embodiments, the fracturing spread 10 may not include all of the components illustrated. For example, the fracturing spread 10 may not include the illustrated gel/ADP trailer 16 when a gel mixture or ADP mixture is not needed to create a desired treatment fluid. In some embodiments, one or more of the illustrated stimulation (e.g., fracturing) equipment components may be separated into two or more separate units. In still other embodiments, two or more of the illustrated equipment component may be incorporated into a single unit. It should be noted that additional equipment components not shown in FIG. 1 may be located at the well site as well, and different numbers and arrangement of the illustrated well stimulation equipment may be used.

In a general well stimulation (e.g., fracturing) operation, the liquid handling equipment 12 may provide water that is entirely made up of potable water, freshwater, and/or treated water for mixing a desired treatment fluid. Other liquid may be provided from the liquid handling equipment 12 as well. The water (or other liquid) may be mixed with a viscosity-increasing agent in the gel/ADP trailer 16 to provide a higher viscosity fluid to help suspend sand or other particulate. The sand handling equipment 14 may output dry bulk material such as sand, proppant, and/or other particulate into the blender unit 18 at a metered rate. The blender unit 18 may mix the sand with the higher-viscosity water-based fluid in a mixing compartment to form a treatment fluid for fracturing the well. As mentioned above, similar equipment components may be utilized to mix various types of treatment fluids for use in other well stimulation applications (i.e., not limited to fracturing).

The blender unit 18 may be coupled to an array of high pressure hydraulic pumping units 20 via a manifold 26. Although only six high pressure hydraulic pumping units 20 are illustrated, several more pumping units 20 may be positioned on location. The high pressure hydraulic pumping units 20 are arranged in parallel and used to deliver the treatment fluid to the wellhead 24 such that the treatment fluid is pumped into the wellbore at a desired pressure for performing the wellbore stimulation.

The control center 22 may be communicatively coupled to various sensing and/or control components on the other stimulation equipment. The control center 22 may include data acquisition components and one or more processing components used to interpret sensor feedback and monitor the operational states of the stimulation equipment located at the well site. In some embodiments, the control center 22 may output control signals to one or more actuation components of the stimulation equipment to control the well stimulation operation based on the sensor feedback.

At the spread 10, many of the large well stimulation equipment components (e.g., liquid handling unit 12, sand handling equipment 14, gel/ADP trailer 16, blender unit 18, high pressure pumping units 20, and tech center 22) must be electrically powered. The power requirements for these components together may be on the order of approximately 30 Megawatts. The disclosed embodiments are directed to using one or more stacks of fuel cells to generate electricity for powering the stimulation equipment present in the fracturing spread 10, instead of using internal/external combustion engines to drive a generator. One or more fuel cell units may be coupled to and used to power the liquid handling equipment 12, the sand handling equipment 14, the gel/ADP trailer 16, the blender unit 18, the high pressure hydraulic pumping units 20, the tech center 22, or a combination thereof, or any other electrically powered equipment on location.

Figure 2:
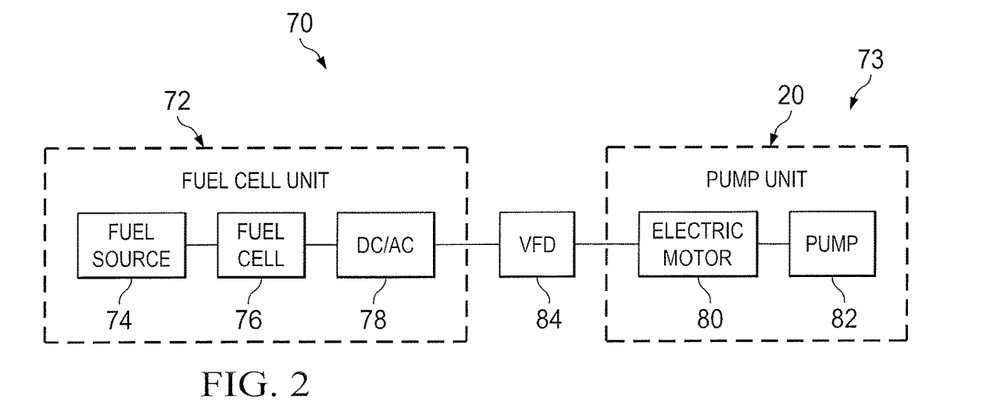
FIG. 2 is a schematic block diagram of a fuel cell-based power conversion system being used to supply power for operating a high pressure pumping unit, in accordance with an embodiment of the present disclosure.

FIG. 2 is a schematic block diagram illustrating a fuel cell-based power conversion system 70 used to provide energy from a fuel cell unit 72 to a stimulation (e.g., fracturing) equipment unit 73. As shown in the illustrated embodiment, the stimulation equipment unit 73 may be a high pressure hydraulic pumping unit 20, as described above with reference to FIG. 1. However, a similar power conversion system 70 may be used to provide energy from a fuel cell unit 72 to any other piece of stimulation equipment 73 at the well site.

As shown, the fuel cell unit 72 may include a fuel source 74, a fuel cell stack 76, and a DC/AC converter 78. The fuel source 74 may include a tank, a fuel container hookup, or some other fuel storage component that can be refilled periodically with fuel transported to the well site. In other embodiments, the fuel source 74 may include a pipeline or other connection to another well located nearby. The fuel cells used in the fuel cell stack 76 may utilize any desirable type of fuel that contains some amount of hydrogen. For example, the fuel cell unit 72 may be designed to run off hydrogen, methane, gasoline, diesel, propane, butane, or any other available hydrocarbon.

The fuel cell stack 76 may include a plurality of fuel cells arranged to convert chemical energy from the fuel into DC electric power output at a desired voltage. The DC/AC converter 78 is coupled to the output of the fuel cell stack 76 and used to convert the DC electric power from the fuel cell stack 76 into AC electric power. As shown in the illustrated embodiment, the DC/AC converter 78 may be incorporated into the fuel cell unit 72. In some embodiments, however, the DC/AC converter 78 may be disposed in a separate standalone unit electrically coupled to the fuel cell unit 72. In other embodiments, the DC/AC conversion may be provided by an inverter, as described below.

As illustrated, the fuel cell stack 76 may be part of a standalone fuel cell unit 72 that is separate from and coupled to the stimulation equipment unit 73. In other embodiments, the fuel cell stack 76 may be incorporated into the stimulation equipment component 73 (e.g., pump unit 20) being powered. That way, the stimulation equipment 73 may remain relatively self-contained.

The fuel cell unit 72 may be used to generate electricity to power the hydraulic pumping unit 20 as illustrated. The hydraulic pumping unit 20 may feature a built-in electric motor 80 coupled to a hydraulic pump 82 used to pump a treatment fluid toward a wellhead, as described above with reference to FIG. 1. The electric motor 80 may convert AC power received from the fuel cell unit 72 into mechanical energy for operating the pump 82 at a desired pumping pressure. The pump 82 may be a reciprocating pump that uses mechanical energy from the electric motor 80 to actuate a piston or plunger for pumping the treatment fluid toward the wellhead at relatively high pressures. The speed of the electric motor 80 operating the pump 82 may directly affect the pressure at which the treatment fluid is sent to the wellhead. Although shown as incorporated into the pumping unit 20, in other embodiments the electric motor 80 used to drive the hydraulic pump 82 may be a separate standalone unit that is coupled to the pumping unit 20 having the pump 82.

As mentioned above, the fuel cell unit 72 may be used to power any desirable stimulation equipment unit 73 on location, not limited to the pumping unit 20. The fuel cell stack 76 may provide all the power for operating an electrically powered device on the stimulation equipment unit 73. For example, the fuel cell unit 72 may be coupled to the blender unit (18 of FIG. 1), the sand handling equipment (14 of FIG. 1), the liquid handling equipment (12 of FIG. 1), the gel/ADP trailer (16 of FIG. 1), and/or the tech center (22 of FIG. 1), to output AC power for operating one or more electrically powered devices on the stimulation equipment. These electrically powered devices may include, for example, electric motors for actuating or operating various mechanical components on the stimulation equipment (e.g., a conveyor, a mixing apparatus, a pump, or a combination thereof). With respect to the tech center 22 and other equipment on location, the electrically powered devices utilizing the AC power may include processor/memory components used to perform sensing, monitoring, and control operations.

In some embodiments, the system 70 may include a variable frequency drive (VFD) 84 coupled between the fuel cell unit and the stimulation equipment unit 73 (e.g., pumping unit 20). The VFD 84 may adjust a frequency and/or voltage of the AC power output from the DC/AC converter 78 into electrical power suitable for operating the one or more stimulation equipment components 73 coupled thereto. That is, the VFD 84 may be used to condition the AC power output from the fuel cell unit 72 for use with whatever electrically powered device is present in the stimulation equipment 73. For example, in the illustrated embodiment having the pumping unit 20, the VFD 84 is designed to adjust the output AC power to a frequency/voltage for operating the electric motor 80 at a speed to operate the pump 82 at the desired pumping rate. In some embodiments, the VFD 84 may be in a separate standalone housing as shown. In other embodiments, however, the VFD 84 may be incorporated into the electric motor 80 of the stimulation equipment 73 coupled to the fuel cell unit 72.

Figure 3:
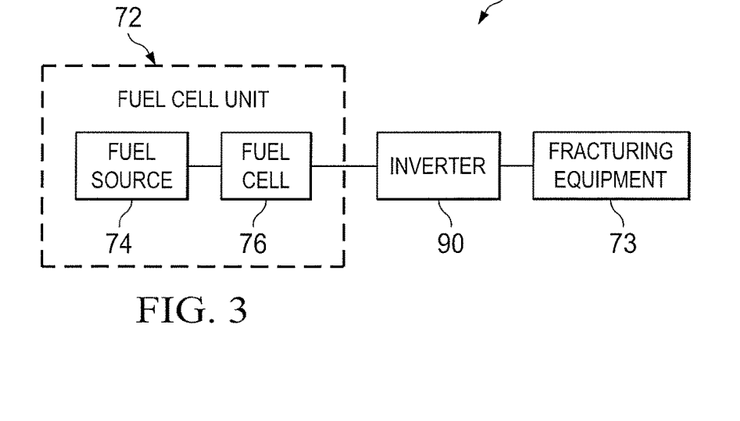
FIG. 3 is a schematic block diagram of a fuel cell-based power conversion system being used to supply power for operating a fracturing equipment component, in accordance with an embodiment of the present disclosure.

Other embodiments of the fuel cell-based power conversion system 70 may be utilized as well. For example, FIG. 3 illustrates an embodiment of the power conversion system 70 that utilizes an inverter 90, instead of a separate DC/AC converter and VFD. The inverter 90 may be used to condition the DC electrical power output from the fuel cell stack 76 to a desired frequency and/or voltage of AC electrical power for operating the electric motor 80 on one or more stimulation equipment components 73.

Figure 4:
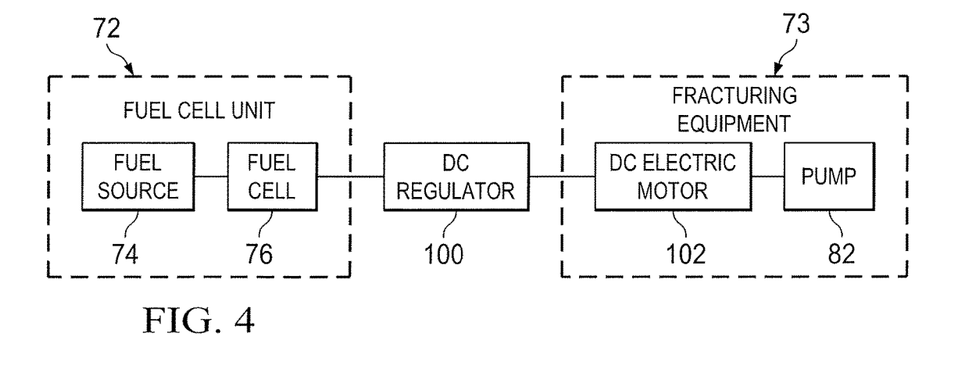
FIG. 4 is a schematic block diagram of a fuel cell-based power conversion system being used to supply power for operating a fracturing equipment component, in accordance with an embodiment of the present disclosure.

In other embodiments, electrical power output from the fuel cell unit 72 may remain in DC across the entire system 70. For example, FIG. 4 illustrates an embodiment of the power conversion system 70 that utilizes a DC regulator 100 to condition the DC electrical power output from the fuel cell stack 76 to a desired voltage for operating a DC electric motor 102 disposed on one or more stimulation equipment components 73.

Using fuel cells to power various stimulation equipment components on location provides certain advantages over existing systems that utilize, for example, diesel engines or turbine engines. First, fuel cells operate at higher efficiencies than diesel engines. This not only improves the energy efficiency of the entire well stimulation operation, but it may reduce the amount of time and cost associated with refueling components at the well site. In addition, the fuel cell units 72 used on location may be disposed at a centralized location in the fracturing spread, separate from the stimulation equipment 73 they are being used to power. This may allow the refueling to be performed quickly and easily at the central location, compared to existing systems where each piece of stimulation equipment includes an onboard diesel engine.

The fuel cell unit 72 may also reduce the amount of emissions expelled to the atmosphere during a particular well stimulation operation, as compared to diesel engines. Accordingly, the fuel cell unit 72 may be particular useful at well sites in areas where emissions are highly regulated. Further, the fuel cell unit 72 provides quieter electrical power generation than is available using internal/external combustion engines. This may be particularly useful at well sites in areas where noise requirements are highly regulated.

Still further, the disclosed power conversion system 70 features fewer energy transfer points than are present in systems that utilize a turbine engine. For example, energy in a gas turbine power generation system may be transferred from the input gas to the turbine and from the turbine to an electric generator, with transfer losses occurring at each of these points. The fuel cell unit 72, however, only transfers energy from the fuel to the fuel cell stack 76 and from the fuel cell stack 76 to the DC/AC converter 78, meaning that less energy may be lost through the system due to it having fewer transfer points.

Figure 6:
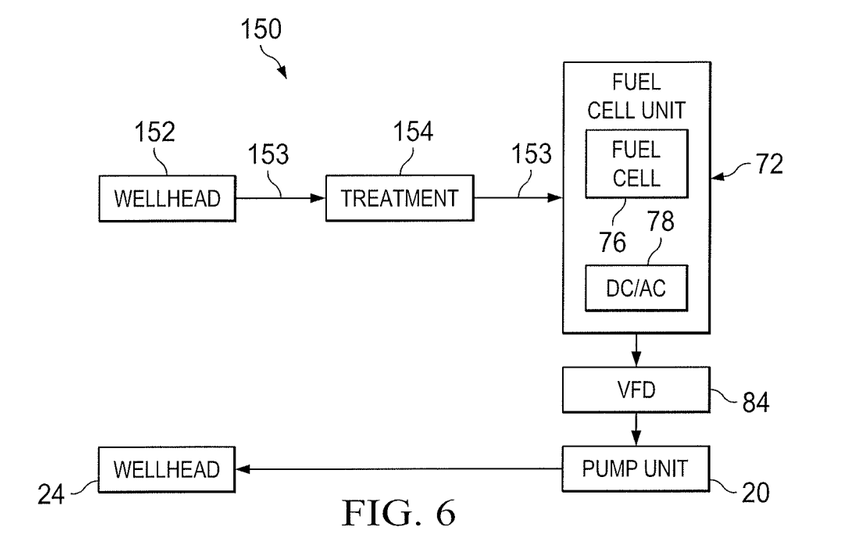
FIG. 6 is a schematic block diagram of a fuel cell-based power conversion system using fuel recovered from a nearby wellhead, in accordance with an embodiment of the present disclosure.

In some embodiments of the system 70, the fuel cell stack 76 may utilize natural gas as the fuel. In some embodiments, this natural gas may be brought in from a remote location to the well stimulation location (and ultimately to the fuel source 74) as compressed natural gas (CNG) or as liquefied natural gas (LNG). In other embodiments, the natural gas may be extracted from other nearby wells and piped to the fuel cell unit 72 (e.g., as shown in FIG. 6).

Figure 5:
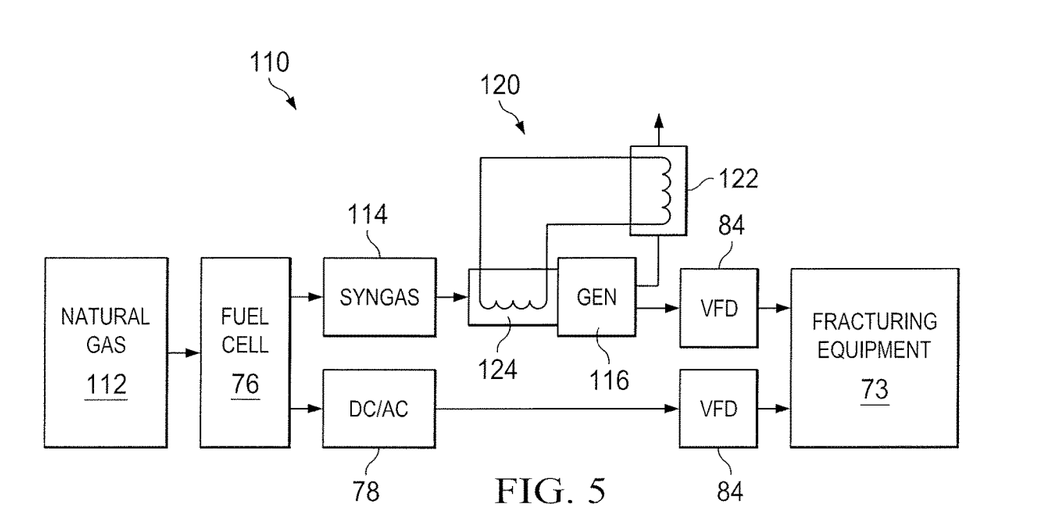
FIG. 5 is a schematic block diagram of a fuel cell-based power conversion system having an additional gas generator for improving the power conversion efficiency, in accordance with an embodiment of the present disclosure.

FIG. 5 illustrates a fuel cell-based power conversion system 110 that may improve the energy efficiency available through the fuel cell unit 72 when using natural gas fuel cells to power stimulation equipment 73. First, natural gas 112 may be supplied to the fuel cell stack 76. The natural gas 112 may be transported as CNG or LNG from a remote location, piped in from another nearby wellbore, or both.

The fuel cell stack 76 may facilitate a reaction to generate electrical power from the natural gas. A by-product of this reaction is syngas 114 (CO and H2). In the illustrated embodiment, the resultant syngas 114 may be burned in a secondary generator 116 to provide additional electrical power for operating various stimulation equipment 73. This may bring the efficiency of the natural gas energy production up to approximately 65%. As illustrated, the generator 116 may be coupled between an outlet of the fuel cell stack 76 and another VFD 84, and the VFD 84 is used to condition the power output from the generator 116 for use in the stimulation equipment 73.

In some embodiments, a heat recovery system 120 may be added to further improve the efficiency of the natural gas energy production available through the system 110. The heat recovery system 120 may include a first heat exchanger 122 disposed at an exhaust section of the gas generator 116 and used to heat a working fluid via hot exhaust gases that are output from the generator 116. The heat recovery system 120 also includes a second heat exchanger 124 disposed at an inlet to the generator 116 and fluidly coupled to the first heat exchanger 122 such that the heated working fluid may be routed from the first heat exchanger 122 to the second heat exchanger 124. The second heat exchanger 124 may heat the incoming syngas 114 via the heated working fluid as the syngas 114 enters the generator 116. By using this heat recovery system 120, the efficiency of the natural gas energy production may be brought up to approximately 95%.

Turning back to FIG. 2, in other embodiments of the disclosed fuel cell unit 72, the fuel cell stack 76 used to generate electricity for powering stimulation equipment 73 may utilize sour gas as a fuel source. Specifically, hydrogen sulfide (H2S) may be extracted from the sour gas and provided to H2S fuel cells in the fuel cell stack 76 to generate electricity used to power the stimulation equipment 73. At least a portion of the sour gas may be extracted from other wells or pipelines in the field.

As mentioned above, the fuel cells in the disclosed systems may use existing wellhead gas (e.g., natural gas and/or sour gas) provided from the field. FIG. 6 schematically illustrates an embodiment of the disclosed fuel cell powered system 150 using gas provided from one wellhead 152 as fuel to power well stimulation operations performed at another wellhead 24. Specifically, wellhead gas (e.g., natural gas or sour gas) may be extracted from the wellhead 152 and routed to the fuel cell unit 72 via a fluid line 153 extending between the wellhead 152 and the fuel cell unit 72. The fluid line 153 may be used to transfer gas or liquid fuel to the fuel cell unit 72. The wellhead gas may undergo various treatments 154 to ensure that the gas is appropriately cleaned or otherwise processed (e.g., separating out the H2S from sour gas) for use as fuel in the fuel cell unit 72. The fuel cell unit 72 may utilize at least a portion of the wellhead gas as fuel in the electrical energy generation process to ultimately output AC power to the VFD 84 or directly to the stimulation equipment on location. In the illustrated embodiment, the DC power output from the fuel cell 76 is converted to AC power by the DC/AC convertor 78 that is then conditioned by the VFD 84 and used to operate the electrical motor of a high pressure hydraulic pumping unit 20. The pumping unit 20 uses the power from the fuel cell unit 72 to pump a treatment fluid to the wellhead 24 at a relatively high pressure.

The illustrated system 150 may use either natural gas or H2S collected from the wellhead 152. The type of fuel and corresponding type of fuel cell unit 72 used on a particular location may be selected based on what type of gas is available from nearby wells. For example, H2S fuel cells may be utilized in areas where the nearby wells produce sour gas. In some embodiments, the fuel available from one or more wellheads 152 in the surrounding area may not be enough to support the sustained operation of the stimulation equipment. To that end, the fuel from the wellhead 152 may be supplemented with additional fuel brought into the well site on trucks. This may be the case, for example, at a new field where there is not a high enough production volume yet to supply the needed fuel for the fuel cell unit 72.

The process of using gas produced at the wellhead 152 to power stimulation equipment may also be applied to waste gas that is produced at a wellbore. Such waste gas is typically flared into the atmosphere at well sites where the main focus is producing oil. However, using the disclosed system 150, one or more fuel cell units 72 on location may utilize this waste gas from the wellhead 152 to power stimulation equipment. This may reduce or eliminate the amount of gas that is flared to the atmosphere and any environmental effects. This may be particularly useful at offshore well sites and other sites that are focused primarily on producing oil.

Figure 7:
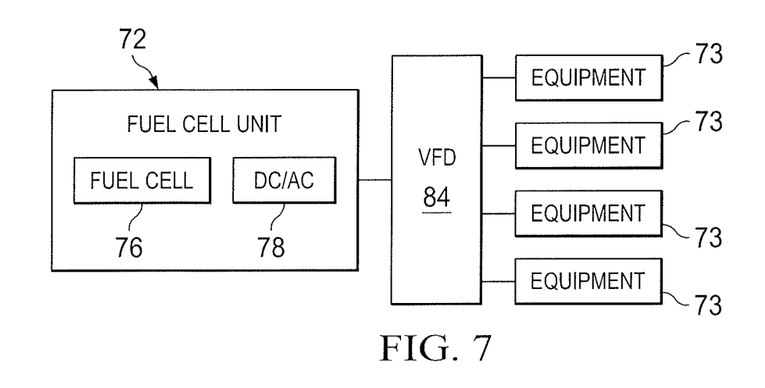
FIG. 7 is a schematic block diagram of a fuel cell-based power conversion system used to operate multiple pieces of fracturing equipment using electricity generated by a single fuel cell unit, in accordance with an embodiment of the present disclosure.

As shown in FIG. 2, the standalone fuel cell unit 72 may be used to power just a single piece of stimulation equipment (e.g., pump unit 20) at the well site. However, as shown in FIG. 7, other embodiments of the fuel cell unit 72 may be coupled to and used to power multiple pieces of stimulation equipment 73. In this embodiment, several large fuel cells may be utilized in the standalone fuel cell unit 72 to provide all the power for operating several pieces of stimulation equipment 73 on location. The VFD 84 may provide the desired AC power to each of the multiple stimulation equipment units 73.

Embodiments disclosed herein include:

A. A system including a fuel cell stack and a well stimulation equipment unit coupled to the fuel cell stack. The fuel cell stack includes one or more fuel cells for converting chemical energy from a fuel to electrical power at an output of the fuel cell stack. The stimulation equipment unit includes an electrically powered device for use in a well stimulation operation at a well site, and the fuel cell stack provides all the power for operating the electrically powered device.

B. A method including supplying a fuel to a fuel cell stack having one or more fuel cells. The method also includes converting chemical energy from the fuel into electrical power provided to an output of the fuel cell stack, and conditioning the electrical power via one or more power devices to output a conditioned electrical power. The method further includes operating an electrical device on a well stimulation equipment unit via the conditioned electrical power, and performing a well stimulation operation at a well site via the electrical device on the stimulation equipment unit.

Each of the embodiments A and B may have one or more of the following additional elements in combination: Element 1: wherein the fuel cell stack comprises one or more fuel cells for converting chemical energy from the fuel to DC power at the output. Element 2: further including a DC/AC converter coupled to the output of the fuel cell stack for converting the DC power to AC power at an output of the DC/AC converter, wherein the stimulation equipment unit is coupled to the DC/AC converter. Element 3: further including a variable frequency drive (VFD) coupled to the output of the DC/AC converter to condition the AC power output from the DC/AC converter for use in the electrically powered device. Element 4: wherein the VFD is integrated into the stimulation equipment unit. Element 5: further including an inverter coupled to the output of the fuel cell stack for converting the DC power to conditioned AC power. Element 6: further including a DC regulator coupled to the output of the fuel cell stack for conditioning the DC power, wherein the electrically powered device on the stimulation unit comprises a DC electric motor. Element 7: wherein the stimulation equipment unit includes a unit selected from the group consisting of: a high pressure hydraulic pumping unit, a blender unit, a gel/advanced dry polymer (ADP) mixer, a sand handling unit, and a control center. Element 8: wherein the stimulation equipment includes a high pressure hydraulic pumping unit, and wherein the electrically powered device includes an electric motor coupled to a reciprocating pump of the high pressure hydraulic pumping unit. Element 9: wherein the fuel cell stack includes one or more natural gas fuel cells that use natural gas as the fuel. Element 10: further including a gas generator coupled to an exhaust outlet of the fuel cell stack to receive syngas output from the fuel cell stack and to convert energy from the syngas into additional electrical power. Element 11: further including a heat recovery system coupled to the gas generator for heating syngas entering the gas generator via heat from an exhaust of the gas generator. Element 12: wherein the fuel cell stack includes one or more hydrogen sulfide (H2S) fuel cells that use H2S as the fuel. Element 13: further including a fluid line extending between a wellhead and the fuel cell stack to route the fuel produced from the wellbore to the fuel cell stack. Element 14: further including a plurality of stimulation equipment units coupled to the DC/AC converter, wherein the fuel cell stack provides all the power for operating the plurality of stimulation equipment units. Element 15: wherein the fuel cell stack and the DC/AC converter are disposed in a fuel cell unit that is separate and standalone from the stimulation equipment unit. Element 16: wherein the fuel cell stack and the DC/AC converter are integrated into the stimulation equipment unit.

Element 17: wherein converting the chemical energy from the fuel into electrical power comprises converting the chemical energy into DC power provided to the output of the fuel cell stack, and wherein conditioning the electrical power comprises conditioning the DC power. Element 18: wherein conditioning the DC power comprises converting the DC power to AC power via a DC/AC converter and adjusting the AC power output from the DC/AC converter via a variable frequency drive (VFD) coupled between the DC/AC converter and the electrical device on the stimulation equipment unit. Element 19: further including controlling a speed of a pump on the stimulation equipment unit via the VFD, wherein the electrical device includes a motor coupled to the pump, and wherein performing the well stimulation operation includes pumping a treatment fluid to a wellhead via the pump. Element 20: wherein supplying the fuel includes transporting liquid natural gas (LNG) or compressed natural gas (CNG) to the well site to refuel the fuel cell stack. Element 21: wherein supplying the fuel includes routing natural gas or hydrogen sulfide (H2S) recovered from a wellhead to the fuel cell stack. Element 22: further including routing syngas output from the fuel cell stack to a separate gas generator and generating additional electric power via the gas generator. Element 23: further including heating a working fluid via a first heat exchanger coupled to an exhaust of the gas generator, routing the heated working fluid from the first heat exchanger to a second heat exchanger at an inlet to the gas generator, and heating the syngas via the second heat exchanger.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
   a fuel cell stack comprising one or more fuel cells for converting chemical energy from a fuel to electrical power at an output of the fuel cell stack;
   a gas generator coupled to an exhaust outlet of the fuel cell stack to receive syngas output from the fuel cell stack and to convert energy from the syngas into additional electrical power, wherein the gas generator is coupled between the exhaust outlet of the fuel cell stack and a variable frequency drive (VFD); and
   a well stimulation equipment unit coupled to the fuel cell stack, wherein the stimulation equipment unit comprises an electrically powered device for use in a well stimulation operation at a well site, and wherein the fuel cell stack provides power for operating the electrically powered device, wherein the VFD is configured to condition the additional electrical power from the gas generator for use in the stimulation equipment.

2. The system of claim 1, wherein the fuel cell stack comprises one or more fuel cells for converting chemical energy from the fuel to DC power at the output.

3. The system of claim 2, further comprising a DC/AC converter coupled to the output of the fuel cell stack for converting the DC power to AC power at an output of the DC/AC converter, wherein the stimulation equipment unit is coupled to the DC/AC converter.

4. The system of claim 3, further comprising a second variable frequency drive (VFD) coupled to the output of the DC/AC converter to condition the AC power output from the DC/AC converter for use in the electrically powered device.

5. The system of claim 4, wherein the second VFD is integrated into the stimulation equipment unit.

6. The system of claim 3, further comprising a plurality of stimulation equipment units coupled to the DC/AC converter, wherein the fuel cell stack provides all the power for operating the plurality of stimulation equipment units.

7. The system of claim 2, further comprising an inverter coupled to the output of the fuel cell stack for converting the DC power to conditioned AC power.

8. The system of claim 2, further comprising a DC regulator coupled to the output of the fuel cell stack for conditioning the DC power, and wherein the electrically powered device on the stimulation unit comprises a DC electric motor.

9. The system of claim 1, wherein the stimulation equipment unit comprises a unit selected from the group consisting of: a high pressure hydraulic pumping unit, a blender unit, a gel/advanced dry polymer (ADP) mixer, a sand handling unit, and a control center.

10. The system of claim 1, wherein the stimulation equipment comprises a high pressure hydraulic pumping unit, and wherein the electrically powered device comprises an electric motor coupled to a reciprocating pump of the high pressure hydraulic pumping unit.

11. The system of claim 1, wherein the fuel cell stack comprises one or more natural gas fuel cells that use natural gas as the fuel.

12. The system of claim 1, further comprising a heat recovery system coupled to the gas generator for heating syngas entering the gas generator via heat from an exhaust of the gas generator.

13. The system of claim 1, wherein the fuel cell stack comprises one or more hydrogen sulfide (H2S) fuel cells that use H2S as the fuel.

14. The system of claim 1, further comprising a fluid line extending between a wellhead and the fuel cell stack to route the fuel produced from the wellbore to the fuel cell stack.

15. A method, comprising:
   supplying a fuel to a fuel cell stack comprising one or more fuel cells;
   converting chemical energy from the fuel into electrical power provided to an output of the fuel cell stack;
   conditioning the electrical power via one or more power devices to output a conditioned electrical power;
   routing syngas output from the fuel cell stack to a separate gas generator and generating additional electric power via the gas generator, wherein the gas generator is coupled between an exhaust outlet of the fuel cell stack and a variable frequency drive (VFD);

operating an electrical device on a well stimulation equipment unit via the conditioned electrical power; and performing a well stimulation operation at a well site via the electrical device on the stimulation equipment unit.

16. The method of claim 15, wherein converting the chemical energy from the fuel into electrical power comprises converting the chemical energy into DC power provided to the output of the fuel cell stack, and wherein conditioning the electrical power comprises conditioning the DC power.

17. The method of claim 16, wherein conditioning the DC power comprises converting the DC power to AC power via a DC/AC converter and adjusting the AC power output from the DC/AC converter via a second variable frequency drive (VFD) coupled between the DC/AC converter and the electrical device on the stimulation equipment unit.

18. The method of claim 17, further comprising controlling a speed of a pump on the stimulation equipment unit via the second VFD, wherein the electrical device comprises a motor coupled to the pump, and wherein performing the well stimulation operation comprises pumping a treatment fluid to a wellhead via the pump.

19. The method of claim 15, wherein supplying the fuel comprises routing natural gas or hydrogen sulfide (H2S) recovered from a wellhead to the fuel cell stack.

20. The method of claim 15, further comprising heating a working fluid via a first heat exchanger coupled to an exhaust of the gas generator, routing the heated working fluid from the first heat exchanger to a second heat exchanger at an inlet to the gas generator, and heating the syngas via the second heat exchanger.

* * * * *